(12) United States Patent
Klein et al.

(10) Patent No.: US 11,971,099 B2
(45) Date of Patent: Apr. 30, 2024

(54) SOIL PROCESSING MACHINE AND METHOD FOR OPERATING A SOIL PROCESSING MACHINE

(71) Applicant: Hamm AG, Tirschenreuth (DE)

(72) Inventors: Thomas Klein, Mitterteich (DE); Ronny Pieske, Zwönitz (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 17/947,393

(22) Filed: Sep. 19, 2022

(65) Prior Publication Data
US 2023/0087782 A1    Mar. 23, 2023

(30) Foreign Application Priority Data

Sep. 20, 2021  (DE) ..................... 10 2021 124 183.9

(51) Int. Cl.
*F16H 61/4104*    (2010.01)
*E01C 19/26*      (2006.01)
(Continued)

(52) U.S. Cl.
CPC ......... *F16H 61/4104* (2013.01); *E01C 19/26* (2013.01); *F16H 61/4139* (2013.01);
(Continued)

(58) Field of Classification Search
CPC ........... F16H 61/4104; F16H 61/44139; F16H 61/4148; F16H 61/4165; F15B 21/005;
(Continued)

(56) References Cited

U.S. PATENT DOCUMENTS 5,493,860 A *  2/1996  Bjerke ................. F15B 21/005
                                              60/458
6,339,928 B1 * 1/2002  Gollner ............... F16H 61/4104
                                              60/464
(Continued)

FOREIGN PATENT DOCUMENTS

DE   102007032005    1/2009
DE   10 2017 215 726 3/2019
(Continued)

OTHER PUBLICATIONS

German Search Report filed in Appl No. 10 2021 124 183.9 dated Jun. 30, 2022.
(Continued)

*Primary Examiner* — Dustin T Nguyen
(74) *Attorney, Agent, or Firm* — Rankin, Hill & Clark LLP

(57) ABSTRACT

A soil processing machine includes a hydraulic drive system including an electrohydraulic pressurized fluid source with at least one electric motor and at least one hydraulic drive pump, a hydraulic drive circuit fed with pressurized fluid by the at least one hydraulic drive pump, at least one hydraulic drive motor fed with pressurized fluid from the hydraulic drive circuit, and a discharge valve assembly for discharging fluid from the hydraulic drive circuit to a fluid reservoir. The hydraulic drive system is designed to operate the discharge valve assembly as a function of at least one of the following parameters: a temperature of the fluid in the hydraulic drive circuit, an ambient temperature, a viscosity of the fluid in the hydraulic drive circuit, a degree of contamination of the fluid in the hydraulic drive circuit, a period of time since the last start-up of the hydraulic drive system, a period of time since the last fluid was discharged from the hydraulic drive circuit.

13 Claims, 1 Drawing Sheet

(51) Int. Cl.
  *F16H 61/4139* (2010.01)
  *F16H 61/4148* (2010.01)
  *F16H 61/4165* (2010.01)
  *E02F 9/22* (2006.01)
  *F15B 21/00* (2006.01)
  *F15B 21/041* (2019.01)
  *F15B 21/0423* (2019.01)
  *F15B 21/045* (2019.01)

(52) U.S. Cl.
  CPC ..... *F16H 61/4148* (2013.01); *F16H 61/4165* (2013.01); *E02F 9/2278* (2013.01); *F15B 21/005* (2013.01); *F15B 21/041* (2013.01); *F15B 21/0423* (2019.01); *F15B 21/045* (2013.01); *F15B 2211/611* (2013.01); *F15B 2211/6343* (2013.01)

(58) Field of Classification Search
  CPC .. F15B 21/041; F15B 21/0423; F15B 21/045; F15B 2211/611; F15B 2211/6343; E01C 19/26; E02F 9/2278
  See application file for complete search history.

(56) References Cited

U.S. PATENT DOCUMENTS

| | | | | |
|---|---|---|---|---|
| 7,111,458 | B2* | 9/2006 | Gandrud | F16H 61/4104 60/464 |
| 7,614,223 | B2* | 11/2009 | St. Aubin | F15B 21/0427 60/329 |
| 8,812,267 | B2* | 8/2014 | Satake | G01N 21/534 184/6.24 |
| 8,833,069 | B2* | 9/2014 | Demick | F16D 31/00 60/464 |
| 10,808,838 | B2* | 10/2020 | Gepraegs | F16K 17/003 |
| 11,306,445 | B2* | 4/2022 | Wiktor | E01C 21/00 |
| 11,346,083 | B1* | 5/2022 | S. P. | E02F 9/226 |
| 2014/0150880 | A1 | 6/2014 | Keine | |

FOREIGN PATENT DOCUMENTS

| | | |
|---|---|---|
| DE | 102017215726 | 3/2019 |
| DE | 10 2018 208 352 | 11/2019 |
| DE | 102018208352 | 11/2019 |
| JP | 62137129 U1 | 8/1987 |
| JP | 2019023420 A | 2/2019 |
| JP | 2022-148347 | 10/2022 |

OTHER PUBLICATIONS

European Search Report for EP 22 19 0888, published Feb. 9, 2023.
Japan Patent Office, English Translation of Office action in JP App. No. 2022-148347 obtained from Global Dossier, dated Jul. 21, 2023, 14 pages.

* cited by examiner

SOIL PROCESSING MACHINE AND METHOD FOR OPERATING A SOIL PROCESSING MACHINE

The present invention relates to a soil processing machine, such as a soil compactor, which can be used to compact the structural material of a region of ground, such as asphalt, soil, or gravel. Furthermore, the present invention relates to a method for operating such a soil processing machine.

An example of such a soil processing machine designed as a soil compactor is shown in FIG. 1. This soil processing machine 10, designed as a soil compactor, is constructed with a rear carriage 12 and a front carriage 14, which is connected to the rear carriage 12 so that it can pivot about an approximately vertical steering axis. Drive wheels 16 are provided on the rear carriage 12 and can be driven to rotate in order to move the soil processing machine 10 over the ground 18 to be compacted. A soil processing roller 20 designed as a compactor roller is rotatably supported on the front carriage 14. In the construction of a soil compactor as shown in FIG. 1, the soil processing roller 20 itself is generally not driven to rotate, but rolls, driven by the drive wheels 16, over the ground 18. For example, in the case of a soil compactor, in which a compactor roller is also provided on the rear carriage 12, one or both of the compactor rollers could be driven to rotate to move the soil compactor over the ground 18.

Also provided on the rear carriage 12 is an operators station 22 in which an operator can sit on an operator's seat 24 in order to operate the soil compactor. The operator's station 22 also contains various actuators, which will be explained below, via which an operator sitting on the operator's seat 24 in the operator's station 22 can operate the soil compactor.

In general, soil compactors of this type have a drive unit designed as a diesel internal combustion engine on the rear carriage 12. The drive unit drives one or more hydraulic pumps to provide pressurized fluid in various hydraulic circuits. For example, a hydraulic drive circuit can be provided, via which hydraulic motors assigned to the drive wheels 16 can be supplied with pressurized fluid in order to move the soil compactor over the ground 18. If such a soil compactor has one or more compactor rollers or soil processing rollers 20 that are driven to rotate, hydraulic motors can also be assigned to these in order to drive them to rotate. Another hydraulic circuit can be used to drive an imbalance system in the soil processing roller 20. An imbalance system of this type, which can be designed to also generate an oscillating movement and/or a vibratory movement of the soil processing roller 20, may comprise one or more hydraulic motors to drive unbalanced masses for rotation. Another hydraulic circuit can be assigned to a steering system. The pressurized fluid present in a hydraulic steering circuit of this type can direct hydraulic fluid, via a hydraulic steering unit, to one or two steering piston/cylinder units 28 acting as steering elements 26, as a function of a steering movement of a steering actuator, for example a steering wheel. Due to such steering piston/cylinder units 28, the front carriage 14 and the rear carriage 12 are pivoted relative to one another about the steering axis, as a result of which the soil compactor is steered over the ground 18 as it moves.

It is the object of the present invention to provide a soil processing machine and a method for operating a soil processing machine with which efficient, energy-saving operation of a hydraulic drive system is achieved.

According to the invention, this object is achieved by a soil processing machine, in particular a soil compactor, comprising a hydraulic drive system, wherein the hydraulic drive system comprises:
- an electrohydraulic pressurized fluid source with at least one electric motor and at least one hydraulic drive pump;
- a hydraulic drive circuit supplied with pressurized fluid by the at least one hydraulic drive pump;
- at least one hydraulic drive motor supplied with pressurized fluid from the hydraulic drive circuit;
- a discharge valve assembly for discharging fluid from the hydraulic drive circuit into a fluid reservoir;
- wherein the hydraulic drive system is designed to operate the discharge valve assembly as a function of at least one of the following parameters for delivering fluid to the fluid reservoir:
  - a temperature of the fluid in the hydraulic drive circuit;
  - a temperature of the fluid in a fluid return to the fluid reservoir;
  - an ambient temperature;
  - a viscosity of the fluid in the hydraulic drive circuit;
  - a degree of contamination of the fluid in the hydraulic drive circuit;
  - a period of time since the last start-up of the hydraulic drive system;
  - a period of time since the last fluid discharge from the hydraulic drive circuit.

By discharging fluid from the hydraulic drive circuit of the hydraulic drive system, it becomes possible to actually only carry out such a discharge when it is necessary or it leads to an increase in the efficiency of the hydraulic drive circuit. The energy introduced into the hydraulic drive circuit via the at least one electric motor of the electrohydraulic pressurized fluid source can thus be used efficiently.

In order to operate the at least one hydraulic drive motor in different directions of rotation with the hydraulic drive circuit, it is proposed that the hydraulic drive circuit comprises a first connecting line between a first connection port of the at least one hydraulic drive pump and a first connection port of the at least one hydraulic drive motor for conveying pressurized fluid from the first connection port of the at least one hydraulic drive pump to the first connection port of the at least one hydraulic drive motor in order to operate the at least one hydraulic drive motor in a first direction of rotation; the hydraulic drive circuit also comprises a second connecting line between a second connection port of the at least one hydraulic drive pump and a second connection port of the at least one hydraulic drive motor for conveying pressurized fluid from the second connection port of the at least one hydraulic drive pump to the second connection port of the at least one hydraulic drive motor in order to operate the at least one hydraulic drive motor in a second direction of rotation.

If the discharge takes place during driving operation, it is particularly advantageous if the hydraulic drive system is designed to operate the discharge valve assembly to discharge fluid from the second connecting line when the at least one hydraulic drive motor is fed with pressurized fluid via the first connecting line and/or if the hydraulic drive system is designed to operate the discharge valve assembly to discharge fluid from the first connecting line when the at least one hydraulic drive motor is fed with pressurized fluid via the second connecting line. This ensures that the discharge of fluid does not impair the supply of pressurized fluid to the at least one hydraulic drive motor.

The discharge valve assembly can comprise a switching valve with a first inlet port connected to the first connecting line, a second inlet port connected to the second connecting line, and an outlet port connected to the fluid reservoir, wherein, in a first valve position of the switching valve, there is a connection between the first inlet port and the outlet port and there is no connection between the second inlet port and the outlet port and, in a second valve position of the switching valve, there is a connection between the second inlet port and the outlet port and there is no connection between the first inlet port and the outlet port. It is thus possible to deliver fluid to the fluid reservoir from each of the connecting lines.

In particular, if the switching valve is primarily intended to provide a connection between the fluid reservoir and one of the connecting lines, the outlet connection of the switching valve can be connected to the fluid reservoir via a shut-off valve for defined adjustment of the quantity of fluid discharged, wherein, in an open position of the shut-off valve, there is a connection between the outlet port and the fluid reservoir and, in a closed position of the shut-off valve, there is no connection between the outlet port and the fluid reservoir.

For suitable consideration of the temperature of the fluid, it is proposed that the hydraulic drive system be designed to operate the discharge valve assembly for discharging fluid to the fluid reservoir as a function of the temperature of the fluid in the first connecting line when the at least one hydraulic drive motor is supplied with pressurized fluid via the first connecting line; the hydraulic drive system is also designed to operate the discharge valve assembly for discharging fluid to the fluid reservoir as a function of the temperature of the fluid in the second connecting line when the at least one hydraulic drive motor is supplied with pressurized fluid via the second connecting line.

The hydraulic drive system may be designed to operate the discharge valve assembly to discharge fluid to the fluid reservoir when the temperature of the fluid in the hydraulic drive circuit is above a predetermined discharge fluid threshold temperature and/or is within a predetermined discharge fluid temperature range. This ensures that the fluid is first brought to a suitable temperature and only then is fluid discharged and replaced by another, generally colder fluid, for example from the fluid reservoir.

In this case, it can be provided that, when the discharge valve assembly is operated to discharge fluid from the hydraulic drive circuit to the fluid reservoir, the quantity of fluid discharged to the fluid reservoir and/or the fluid discharge rate is adjusted as a function of the ambient temperature and/or the degree of contamination and/or the time that has elapsed since the last start-up of the hydraulic drive system and/or the time that has elapsed since the last fluid discharge from the hydraulic drive circuit. An even more precise consideration of the parameters influencing the operating state of the hydraulic drive system is thus made possible.

Furthermore, the hydraulic drive system is designed to operate the discharge valve assembly to discharge fluid to the fluid reservoir when the temperature of the fluid in a leakage line leading to the fluid reservoir and/or in the region of a fluid cooler leading to the fluid reservoir is above a certain discharge fluid threshold temperature and/or is within a certain discharge fluid temperature range. Such fluid leaks, for example, from one or more hydraulic drive motors into the leakage line leading into the fluid reservoir or a fluid cooler through which fluid returned to the fluid reservoir flows, form system regions of a fluid return. The fluid temperature present therein can also be used as an indicator for triggering a discharge process.

As an alternative or in addition to consideration of the temperature of the fluid in the hydraulic drive circuit, the hydraulic drive system can be designed to operate the discharge valve assembly to discharge fluid to the fluid reservoir when the ambient temperature is above a predetermined discharge ambient threshold temperature and/or is within a predetermined discharge ambient temperature range. A low ambient temperature generally means that the fluid in the hydraulic drive circuit also has a low temperature or is cooling down more quickly, so that taking the ambient temperature into account can also prevent a discharge which would lead to a lower degree of efficiency.

Furthermore, the hydraulic drive system can be designed to operate the discharge valve assembly to discharge fluid to the fluid reservoir when the viscosity of the fluid in the hydraulic drive circuit is below a predetermined threshold viscosity and/or is within a predetermined viscosity range. The viscosity of the fluid in the hydraulic drive circuit can be determined, for example, by the pressure drop between two pressure measurement points in the hydraulic drive circuit and represents a parameter that is directly linked to the temperature of the fluid. Also taking into account the viscosity of the fluid, it can be ensured that no fluid is discharged or, for example, that only a small amount of the fluid is discharged as long as the viscosity is too high, i.e. the fluid is comparatively viscous. According to this aspect of the present invention, fluid is only discharged after a sufficient operating time once the viscosity has dropped in order to keep the viscosity within a range of values that is optimal for an efficient use of energy.

According to another design aspect, it can be provided that the hydraulic drive system is designed to operate the discharge valve assembly to discharge fluid to the fluid reservoir when the degree of contamination of the fluid in the hydraulic drive circuit is above a predetermined degree-of-contamination discharge threshold and/or within a predetermined degree-of-contamination range. The degree of contamination of the fluid can be detected in transmission or absorption, for example, by optical detectors. If it is determined that the fluid circulating in the hydraulic drive circuit contains too high a proportion of contaminant particles, part of this fluid can be discharged and, for example, passed through a particulate filter as it flows to the fluid reservoir in order to clean it. Alternatively or additionally, fluid that is newly fed into the hydraulic drive circuit can be subjected to filtering when being discharged from the fluid reservoir.

According to a further aspect of the invention, the hydraulic drive system can be designed to operate the discharge valve assembly to discharge fluid to the fluid reservoir when a predetermined time has elapsed since the last start-up of the hydraulic drive system and/or when a predetermined time has elapsed since the last fluid discharge from the hydraulic drive circuit.

In order to ensure that sufficient fluid is available in the hydraulic drive circuit even during or after fluid is discharged therefrom, it is proposed that a hydraulic steering circuit be provided and that the hydraulic steering circuit be designed to resupply fluid to the hydraulic drive circuit.

The object specified at the outset is further achieved by a method for operating a soil processing machine, preferably a soil processing machine constructed according to the invention, comprising a hydraulic drive system, wherein the hydraulic drive system comprises:

an electrohydraulic pressurized fluid source with at least one electric motor and at least one hydraulic drive pump;
a hydraulic drive circuit supplied with pressurized fluid by the at least one hydraulic drive pump;
at least one hydraulic drive motor supplied with pressurized fluid from the hydraulic drive circuit;
a discharge valve assembly for discharging fluid from the hydraulic drive circuit into a fluid reservoir;
wherein the discharge valve assembly is operated to discharge fluid to the fluid reservoir as a function of at least one of the following parameters:
a temperature of the fluid in the hydraulic drive circuit;
a temperature of the fluid in a fluid return to the fluid reservoir;
an ambient temperature;
a viscosity of the fluid in the hydraulic drive circuit;
a degree of contamination of the fluid in the hydraulic drive circuit;
a period of time since the last start-up of the hydraulic drive system;
a period of time since the last fluid discharge from the hydraulic drive circuit.

The present invention is described in detail below with reference to the attached figures. In the drawing.

Figure 1:
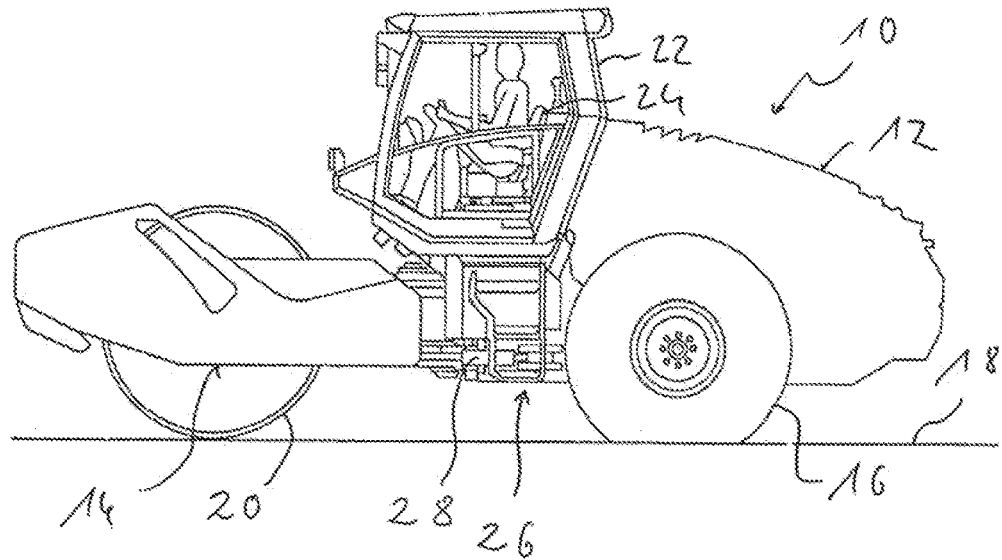
FIG. 1 is a side view of a soil processing machine designed as a soil compactor.

Before the structure and function of a hydraulic steering system and a hydraulic drive system of a soil processing machine are explained in detail below with reference to FIG. 2, it should be pointed out that the systems described below with reference to FIG. 2 can be used with a soil processing machine 10 designed as a soil compactor, as shown in FIG. 1. In principle, however, it should be noted that the systems described below with reference to FIG. 2 can also be used in differently designed soil processing machines, for example soil processing machines that have soil processing rollers on a front carriage and on a rear carriage.

Figure 2:
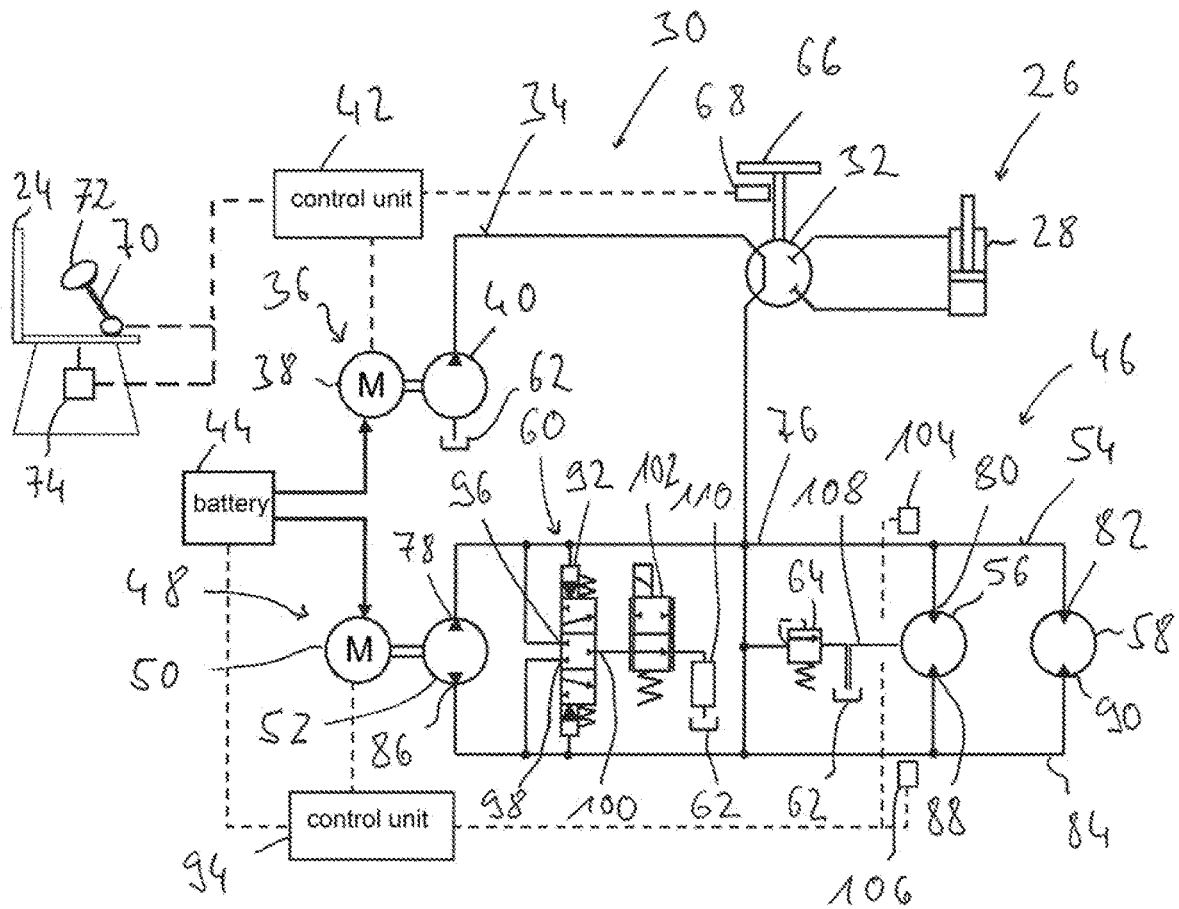
FIG. 2 is a principle representation of a hydraulic steering system and a hydraulic drive system of a soil processing machine.

FIG. 2 shows a hydraulic steering system, generally designated as 30. The hydraulic steering system 30 comprises one or more steering elements 26 designed as double-acting steering piston/cylinder units 28, which are coupled to a steering pressurized fluid circuit 34 via a hydraulic steering unit 32. The hydraulic steering system 30 comprises an electrohydraulic pressurized fluid source 36 with an electric motor 38 and a steering pressurized fluid pump 40 driven by the electric motor 38. The electric motor 38 of the hydraulic steering system 30 is actuated by a control unit 42 and is supplied from a voltage source, for example a battery 44, in order to drive the steering pressurized fluid pump 40. An electrical voltage can be applied to the electric motor 38 from the battery 44 in accordance with corresponding control specifications from the control unit 42.

FIG. 2 further shows a hydraulic drive system, generally designated as 46. The hydraulic drive system 46 comprises a hydraulic pressurized fluid source 48 with an electric motor 50 and a hydraulic drive pump 52 driven by the electric motor 50. The hydraulic drive pump 52 conveys a fluid, for example hydraulic oil, in a hydraulic drive circuit 54 and thus supplies two hydraulic drive motors 56, 58 integrated into the hydraulic drive circuit 54 with pressurized fluid. For example, the two hydraulic drive motors 56, 58 can be assigned to two soil processing rollers provided on a soil compactor in order to drive each of these soil processing rollers to move the soil compactor. In the construction of a soil processing machine shown in FIG. 1, one of the two hydraulic drive motors 56, 58 could be assigned to one of the two drive wheels 16, and the other of the two hydraulic drive motors 56, 58 could be assigned to the other drive wheel 16.

The hydraulic drive circuit 46 also comprises a discharge valve assembly 60 via which fluid can be discharged from the hydraulic drive circuit 46 to a fluid reservoir 62. The hydraulic steering pump 40 conveys fluid from this fluid reservoir 62 into the hydraulic steering circuit 34, which, as shown in FIG. 2, is linked to the hydraulic drive circuit 54 in such a way that fluid discharged from the hydraulic steering pump 40 into the hydraulic steering circuit 34 as pressurized fluid, for example hydraulic oil, can be introduced into the hydraulic drive circuit 46. Thus, it is possible to keep the quantity of fluid present in the hydraulic drive circuit 54 essentially constant, for example when fluid is discharged from the hydraulic drive circuit 46 into the fluid reservoir 62 via the discharge valve assembly 60, by replenishing fluid from the hydraulic steering circuit 34. Fluid leaks occurring in the hydraulic drive circuit 54 can also be compensated for in this way.

The hydraulic steering circuit 34 also comprises a return valve 64 via which fluid or pressurized fluid can be discharged from the hydraulic steering circuit 34 back into the fluid reservoir 62. The return valve 64 can be pressure-controlled, for example, so that when the fluid pressure in the hydraulic steering circuit 34 or even in the hydraulic drive circuit 54 exceeds a predetermined threshold pressure, fluid can be delivered to the fluid reservoir 62.

In order to steer a soil processing machine, for example the soil processing machine 10 shown in FIG. 1, a steering actuator 66 is provided which is generally designed as a steering wheel. An operator occupying a seat in the operators station 22 can steer the soil processing machine 10 moving over the ground 18 to be cultivated by operating the steering actuator 66, i.e. by turning a steering wheel. The steering movement of the steering actuator 66 in the hydraulic steering unit 32 is converted into a corresponding supply of pressurized fluid into one of the chambers of each steering piston/cylinder unit 28 and a corresponding discharge of pressurized fluid from the other of the two chambers of each steering piston/cylinder unit 28.

The actuation of the steering actuator 66 is detected by a steering sensor 68. This steering sensor can detect, for example, the rotational movement of a steering shaft coupled to the steering actuator 66 for joint rotation and can output a signal containing information representing the steering state to the control unit 42. This information can be, for example, information about the current rotational position of the steering actuator 66 or the steering shaft coupled thereto, which represents a steering angle.

Additional elements, via which an operator can operate such a soil processing machine 10, are provided in the operator's station 22. The operator can set the soil processing machine 10 in motion by means of a driving actuator 72 embodied, for example, as a drive actuation lever 70. This means that, for example by pivoting the drive actuation lever 70, the electric motor 50 of the electrohydraulic pressurized fluid source 48 of the hydraulic drive system 46 is operated at a speed which corresponds to the drive operating state specified by the operator. For example, the operator can move the drive actuation lever 70 to a parking position. When the drive actuation lever 70 is in the parking position, the soil processing machine 10 is basically at a standstill and a parking brake can be activated, for example, in order to prevent the machine from rolling away. A driving preparation state is assumed by pivoting from the parking position into a driving preparation position. In the driving preparation state, the hydraulic drive motors 56, 58 still remain inactive, i.e. the electric motor 50 is kept inoperative as in the parking state, but the parking brake is released, for example. When pivoting from the driving preparation position corresponding to the driving preparation state to a driving position corresponding to a driving state, a voltage corresponding to the respective pivot position is applied to the electric motor 50, for example, so that it drives the hydraulic drive pump 52 in a direction of rotation corresponding to a respective driving direction and both hydraulic drive motors 56, 58 are supplied with pressurized fluid, whereby the soil processing machine 10 is moved over the ground 18.

A seat occupancy sensor 74 can be assigned to the operators seat 24, which provides information about whether an operator is sitting on the operators seat 24 or not. This information, like the information about a respective operating position or an operating state of the driving actuator 72, can be introduced into the control unit 42 in order to operate the electric motor 38 of the electrohydraulic pressurized fluid source 36 taking this information into account.

Taking into account the information representing the seat occupancy or the actuation state of the driving actuator 72, the control unit 42 can control the electric motor 38, for example, in such a way that, when the driving actuator 72 is placed in the parking position, the electric motor 38 is deactivated or is kept in a deactivated state, which means that no voltage is applied thereto. Alternatively or additionally, this can take place when the information supplied by the seat occupancy sensor 74 indicates that there is not an operator sitting in the operator's seat 24.

If the driving actuator 72 is in the driving preparation position corresponding to the driving preparation state, which is generally the case when an operator acting on the driving actuator 72 is sitting on the operator's seat 24, the electric motor 38 of the electrohydraulic pressurized fluid source 36 can be operated by the control unit 42 in such a way that it rotates at a base speed. As a result, pressure is built up in the hydraulic steering circuit 34.

If the driving actuator 72 is brought into the driving position corresponding to the driving state, the voltage applied to the electric motor 38 of the electrohydraulic pressurized fluid source 36 can be specified under the control effect of the control unit 42 in such a way that the electric motor 38 is operated at a working speed faster than the basic speed, wherein the working speed can be fixed, for example. The control unit 42 can adjust the working speed of the electric motor 38 of the electrohydraulic pressurized fluid source 36 taking into account the steering information, for example information about the steering angle or a steering angle change rate to be provided according to an actuation of the steering actuator 66.

The hydraulic drive circuit 54 comprises a first connecting line 76, which establishes a connection between a first connection port 78 of the hydraulic drive pump 52 and a respective first connection port 80, 82 of the two hydraulic drive motors 56, 58. The hydraulic drive circuit 54 also comprises a second connecting line 84, which establishes a connection between a second connection port 86 of the hydraulic drive pump 52 and a respective second connection port 88, 90 of the two hydraulic drive motors 56, 58.

Depending on the direction of rotation in which the hydraulic drive pump 52 is driven by the electric motor 50 of the electrohydraulic pressurized fluid source 48, the fluid present in the hydraulic drive circuit 54 is conveyed to the two hydraulic drive motors 56, 58 as pressurized fluid via the first connecting line 76 or the second connecting line 84. Depending on which of the two connecting lines 76, 84 is supplying the hydraulic drive motors 56, 58 with pressurized fluid, they rotate in one of two possible directions of rotation, as a result of which the soil processing machine can be moved in different directions of movement, i.e. forwards or backwards.

The discharge valve assembly 60 comprises a switching valve 92 designed as a directional control valve, which is controlled by a control unit 94 which, for example, also controls the electric motor 50. The switching valve 92 has a first inlet port 96 which is connected to the first connecting line 76 and a second inlet port 98 which is connected to the second connecting line 84. The switching valve 92 also comprises an outlet port 100 which is connected to the fluid reservoir 62 via a shut-off valve 102, which is designed, for example, as a proportional valve and is likewise controlled by the control unit 94.

As regards the discharge valve assembly 60, the switching valve 92 basically serves to establish a connection between one of the two connecting lines 76, 84 and the fluid reservoir 62. The switching valve 92 can also be brought into a neutral position, in which the connection between each of the two connecting lines 76, 84 and the fluid reservoir 62 is fundamentally interrupted, regardless of the position of the shut-off valve 102. When one of the two connecting lines 76, 84 or the assigned first or second inlet port 96, 98 is connected to the outlet port 100 via the switching valve 92, the shut-off valve 102, in turn, has the task of establishing or interrupting the connection to the fluid reservoir 62 by switching between an open position and a closed position in order to discharge fluid from one of the two connecting lines 76, 84 to the reservoir 62 and in particular also to set the discharge quantity or the discharge rate.

In assignment to the hydraulic drive circuit 54, two temperature sensors 104, 106 are also provided in the exemplary embodiment shown. Temperature sensor 104 is positioned in such a way that it detects the temperature of the fluid in the hydraulic drive circuit 54 in a region of the first connecting line 76 just before or close to the first connection ports 80, 82 of the hydraulic drive motors 56, 58 and routes corresponding information to the control unit 94. Temperature sensor 106 is positioned in such a way that it detects the temperature of the fluid in the hydraulic drive circuit 54 in the second connecting line 84 just before or close to the second connection ports 88, 90 of the hydraulic drive motors 56, 58. The temperature information supplied by temperature sensor 106 is also introduced into the control unit 94.

Taking into account the temperature information provided by the temperature sensors 104, 106, the control unit 94 controls the discharge valve assembly 60 in the manner described below in such a way that fluid is discharged from the hydraulic drive circuit 54 to the reservoir 62 at a suitable time and with a suitable quantity. In order to keep the amount of fluid present or circulating in the hydraulic drive circuit 54 essentially constant, the electrohydraulic pressurized fluid source 36 of the hydraulic steering system 30 can be operated at the same time such that sufficient fluid is resupplied to the hydraulic drive circuit 54 via the hydraulic steering circuit 34.

It is assumed, for example, that the electric motor 50 of the electrohydraulic pressurized fluid source 48 of the hydraulic drive system 46 is operated in such a way that the hydraulic drive pump 52 directs pressurized fluid to the two hydraulic drive motors 56, 58 via the first connecting line 76 and causes them to rotate in a first direction of rotation, for example, to move the soil processing machine 10 forward. In this state, with the shut-off valve 102 still held in its closed position, for example, the switching valve 92 can be switched into a valve position in which the second inlet port 96 and thus the second connecting line 84 are connected to the outlet port 100. If the signal provided by temperature sensor 104 indicates a temperature of the fluid in a region just upstream of the hydraulic drive motors 56, 58 to be fed that is below a predetermined discharge fluid threshold temperature of, for example, approximately 50° C. or is not in a predetermined discharge fluid temperature range, the shut-off valve 102 remains in its closed position, so that no fluid is discharged from the hydraulic drive circuit 54.

If the temperature of the fluid in the hydraulic drive circuit 54 in the region just upstream of the hydraulic drive motors 56, 58 exceeds the discharge fluid threshold temperature or the discharge fluid temperature range is reached, the shut-off valve 102 is activated by the control unit 94 in such a way that fluid is discharged from the hydraulic drive circuit 54 into the fluid reservoir 62. It can be provided for a respective discharge process, for example, that a quantity of fluid defined by corresponding activation of the shut-off valve 102 is also discharged at a defined rate, for example, in order to ensure that sufficient fluid can be replenished via the hydraulic steering circuit 34.

If the hydraulic drive pump 52 is operated in such a way that the two hydraulic drive motors 56, 58 are supplied with pressurized fluid via the second connecting line 84, the switching valve 92 can be brought into such a valve position, in which a connection is established between the first inlet port 96 and the outlet port 100, for example with the shut-off valve 102 again being held in its closed position, and thus a connection is established between the first connecting line 76 and the outlet port 100. If the temperature signal supplied by temperature sensor 106 indicates that the temperature of the fluid in this region is above the discharge fluid threshold temperature or within the discharge fluid temperature range shortly before the region in which the pressurized fluid is supplied to the two hydraulic drive motors 56, 58, the control unit 94 controls the shut-off valve 102 such that fluid is discharged from the first connecting line 76 in the direction of the fluid reservoir 62 with a predetermined amount and/or at a predetermined discharge rate.

The discharge of fluid from the hydraulic drive circuit 54 only when it is at a sufficiently high temperature, for example, ensures that, for example when the hydraulic drive system 46 or soil processing machine 10 is started up, a discharge is initially suppressed and it is ensured that the fluid is quickly brought to a suitable operating temperature, for example in the range of about 40° C. to 65° C. By suppressing a discharge when the temperature of the fluid is not yet sufficiently high enough, the time it takes for a sufficient temperature to be reached is kept as short as possible in order in this way to reach an operating state in which a high level of efficiency in the hydraulic drive system 46 is achieved as quickly as possible due to sufficiently low viscosity of the fluid. Only when this is guaranteed is fluid repeatedly discharged in successive discharge processes in order to keep the temperature of the fluid in the hydraulic drive circuit 54 within an optimum range. Alternatively, in such an operating state, fluid could also be discharged continuously at a comparatively low rate and replenished from the fluid reservoir 62 via the hydraulic steering circuit 34.

Furthermore, in the procedure described above, fluid is discharged from the hydraulic drive circuit 54 from that respective region which is not being used to supply pressurized fluid to the hydraulic drive motors 56, 58. This prevents a pressure drop, due to the discharge of fluid, from occurring on the pressure side of the hydraulic drive motors 56, 58, i.e. in the region of the particular connecting line 76, 84 which is being used to supply pressurized fluid to the hydraulic drive motors 56, 58.

The consideration of the temperature of the fluid in the hydraulic drive circuit 54 in a region just upstream of the hydraulic drive motors 56, 58 supplied with pressurized fluid also ensures that a fluid temperature is taken into account which approximately corresponds to an average temperature. In general, the fluid in the fluid reservoir 62 will have the lowest temperature, and a region just downstream of the hydraulic drive motors 56, 58 supplied with pressurized fluid will have the highest temperature. Nevertheless, it is pointed out that the temperature of the fluid in other regions of the hydraulic drive circuit 54 or the hydraulic drive system 46 can of course also be taken into account.

FIG. 2 shows a leakage line 108 and a fluid cooler 110 as system regions of a fluid return, via which fluid is fed back into the fluid reservoir 62. A fluid leakage occurring in the hydraulic drive motors 56, 58, for example, can be fed back into the fluid reservoir 62 via the leakage line 108. Fluid that is returned to the fluid reservoir from various system regions can be directed through the one or optionally more fluid coolers 110 in order to dissipate heat there. The temperature of the fluid can also be detected in the region of such a fluid return, for example in the region of the leakage line 108 and/or in the region of the fluid cooler 110, and used as a basis for triggering a discharge process.

The principles of the present invention, in which fluid is discharged from the hydraulic drive circuit 54 when the efficiency of the hydraulic drive 46 is not impaired or can be increased, can also be applied when other parameters are taken into account, as an alternative to or in addition to considering the temperature of the fluid in the hydraulic drive circuit 54. For example, the ambient temperature in the region of the soil processing machine 10 can be taken into account in the same way, since a low ambient temperature generally also means that the fluid in the hydraulic drive circuit 54 has a comparatively low temperature. In association with the ambient temperature, it is therefore possible to define a discharge ambient temperature threshold or a discharge ambient temperature range which, if exceeded or reached, results in the triggering of a discharge process. The viscosity of the fluid in the hydraulic drive circuit 54, which is directly related to the temperature of the fluid, can also be taken into account as a parameter when allowing or suppressing a discharge process, as can the degree of contamination of the fluid in the hydraulic drive circuit 54. The period of time since the last start-up of the hydraulic drive system 46 can also be considered as a further parameter. If a predetermined operating time is reached, it can be assumed that the fluid in the hydraulic drive circuit 54 has reached a sufficiently high temperature so that the discharge of fluid does not lead to an impairment of the efficiency of the hydraulic drive circuit. The period of time since such a discharge process was last carried out can also be used as a criterion for carrying out a discharge process again.

It is also possible to link several such parameters by using one or more of these parameters essentially as a criterion for triggering a discharge process, while one or more other parameters are applied to determine the quantity or rate at which fluid is discharged. For example, the temperature of the fluid in the hydraulic drive circuit 54 can be used in the manner described above as a criterion for triggering a discharge process, while the ambient temperature can be used as a criterion for the quantity of fluid to be discharged and/or the discharge rate, for example in such a way that the discharge quantity of the fluid increases and/or the discharge rate increases as the ambient temperature increases.

Finally, it should be pointed out that such a soil processing machine can of course be varied in a wide variety of aspects. Thus, with the hydraulic steering system, the electrohydraulic pressurized fluid source can comprise a plurality of steering pressurized fluid pumps, wherein these can be operated by a common electric motor or, if appropriate, a separate electric motor of the electrohydraulic pressurized fluid source. Several hydraulic drive pumps can also be provided in the region of the hydraulic drive system, which pumps can be driven by a common electric motor or, if appropriate, by respectively separate electric motors. As already explained, a soil processing machine designed as a soil compactor, for example, can of course be designed differently than previously described or shown in FIG. 1 with regard to the use of soil processing rollers or drive wheels. Furthermore, in addition to the above-mentioned parameters, other influencing variables relevant to the operation of the hydraulic drive system can be taken into account for the discharge of fluid from the hydraulic drive circuit or the suppression of a discharge.

The invention claimed is:

1. A soil processing machine, comprising a hydraulic drive system, wherein the hydraulic drive system comprises:
an electrohydraulic pressurized fluid source with at least one electric motor and at least one hydraulic drive pump;
a hydraulic drive circuit supplied with pressurized fluid by the at least one hydraulic drive pump;
at least one hydraulic drive motor supplied with pressurized fluid from the hydraulic drive circuit; and
a discharge valve assembly for discharging fluid from the hydraulic drive circuit into a fluid reservoir;
wherein the hydraulic drive system is designed to operate the discharge valve assembly as a function of at least one of the following parameters for delivering fluid to the fluid reservoir:
a temperature of the fluid in the hydraulic drive circuit;
a temperature of the fluid in a fluid return to the fluid reservoir;
an ambient temperature;
a viscosity of the fluid in the hydraulic drive circuit;
a degree of contamination of the fluid in the hydraulic drive circuit;
a period of time since the last start-up of the hydraulic drive system;
a period of time since the last fluid discharge from the hydraulic drive circuit;
wherein the hydraulic drive system is designed to trigger a discharge operation of the discharge valve assembly to discharge fluid to the fluid reservoir when the temperature of the fluid in the hydraulic drive circuit is above a predetermined discharge fluid threshold temperature or is within a predetermined discharge fluid temperature range and,
when the discharge valve assembly has been triggered to discharge fluid from the hydraulic drive circuit to the fluid reservoir in dependence on the temperature of the fluid in the hydraulic drive circuit, to adjust the quantity of fluid discharged to the fluid reservoir and/or the fluid discharge rate as a function of the ambient temperature and/or the degree of contamination and/or the time that has elapsed since the last start-up of the hydraulic drive system and/or the time that has elapsed since the last fluid discharge from the hydraulic drive circuit.

2. The soil processing machine according to claim 1, wherein the hydraulic drive circuit comprises a first connecting line between a first connection port of the at least one hydraulic drive pump and a first connection port of the at least one hydraulic drive motor for conveying pressurized fluid from the first connection port of the at least one hydraulic drive pump to the first connection port of the at least one hydraulic drive motor in order to operate the at least one hydraulic drive motor in a first direction of rotation; the hydraulic drive circuit also comprises a second connecting line between a second connection port of the at least one hydraulic drive pump and a second connection port of the at least one hydraulic drive motor for conveying pressurized fluid from the second connection port of the at least one hydraulic drive pump to the second connection port of the at least one hydraulic drive motor in order to operate the at least one hydraulic drive motor in a second direction of rotation.

3. The soil processing machine according to claim 2, wherein the hydraulic drive system is designed to operate the discharge valve assembly to discharge fluid from the second connecting line when the at least one hydraulic drive motor is fed with pressurized fluid via the first connecting line and/or the hydraulic drive system is designed to operate the discharge valve assembly to discharge fluid from the first connecting line when the at least one hydraulic drive motor is fed with pressurized fluid via the second connecting line.

4. The soil processing machine according to claim 2, wherein the discharge valve assembly includes a switching valve with a first inlet port connected to the first connecting line, a second inlet port connected to the second connecting line, and an outlet port connected to the fluid reservoir, wherein, in a first valve position of the switching valve, there is a connection between the first inlet port and the outlet port and there is no connection between the second inlet port and the outlet port and, in a second valve position of the switching valve, there is a connection between the second inlet port and the outlet port and there is no connection between the first inlet port and the outlet port.

5. The soil processing machine according to claim 4, wherein the outlet port of the switching valve is connected to the fluid reservoir via a shut-off valve, wherein, in an open position of the shut-off valve, there is a connection between the outlet port and the fluid reservoir and, in a closed position of the shut-off valve, there is no connection between the outlet port and the fluid reservoir.

6. The soil processing machine according to claim 2, wherein the hydraulic drive system is configured to operate the discharge valve assembly for discharging fluid to the fluid reservoir as a function of the temperature of the fluid in the first connecting line when the at least one hydraulic drive motor is supplied with pressurized fluid via the first connecting line and designed to operate the discharge valve assembly for discharging fluid to the fluid reservoir as a function of the temperature of the fluid in the second connecting line when the at least one hydraulic drive motor is supplied with pressurized fluid via the second connecting line.

7. The soil processing machine according to claim 1, wherein the hydraulic drive system is designed to operate the discharge valve assembly to discharge fluid to the fluid reservoir when at least one of the following applies:
the temperature of the fluid in a leakage line leading to the fluid reservoir is above a predetermined discharge fluid threshold temperature;

the temperature of the fluid in the leakage line is within a predetermined discharge fluid temperature range;

the temperature of the fluid in the region of a fluid cooler leading to the fluid reservoir is above the predetermined discharge fluid threshold temperature;

the temperature of the fluid in the region of the fluid cooler is within the predetermined discharge fluid temperature range.

8. The soil processing machine according to claim 1, wherein the hydraulic drive system is designed to operate the discharge valve assembly to discharge fluid to the fluid reservoir when the ambient temperature is above a predetermined discharge fluid threshold temperature and/or is within a predetermined discharge fluid temperature range.

9. The soil processing machine according to claim 1, wherein the hydraulic drive system is designed to operate the discharge valve assembly to discharge fluid to the fluid reservoir when the viscosity of the fluid in the hydraulic drive circuit is below a predetermined threshold viscosity and/or is within a predetermined viscosity range.

10. The soil processing machine according to claim 1, wherein the hydraulic drive system is designed to operate the discharge valve assembly to discharge fluid to the fluid reservoir when the degree of contamination of the fluid in the hydraulic drive circuit is above a predetermined degree-of-contamination discharge threshold and/or is within a predetermined degree-of-contamination range.

11. The soil processing machine according to claim 1, wherein the hydraulic drive system is designed to operate the discharge valve assembly to discharge fluid to the fluid reservoir when a predetermined time has elapsed since the last start-up of the hydraulic drive system and/or when a predetermined time has elapsed since the last fluid discharge from the hydraulic drive circuit.

12. The soil processing machine according to claim 1, wherein a hydraulic steering circuit is provided and in that the hydraulic steering circuit is designed to replenish fluid in the hydraulic drive circuit.

13. A method for operating a soil processing machine, the soil processing machine comprising a hydraulic drive system, wherein the hydraulic drive system comprises:

an electrohydraulic pressurized fluid source with at least one electric motor and at least one hydraulic drive pump;

a hydraulic drive circuit supplied with pressurized fluid by the at least one hydraulic drive pump;

at least one hydraulic drive motor supplied with pressurized fluid from the hydraulic drive circuit; and a discharge valve assembly for discharging fluid from the hydraulic drive circuit into a fluid reservoir;

wherein the discharge valve assembly is operated to discharge fluid to the fluid reservoir as a function of at least one of the following parameters:

a temperature of the fluid in the hydraulic drive circuit;

a temperature of the fluid in the fluid return to the fluid reservoir;

an ambient temperature;

a viscosity of the fluid in the hydraulic drive circuit;

a degree of contamination of the fluid in the hydraulic drive circuit;

a period of time since the last start-up of the hydraulic drive system;

a period of time since the last fluid discharge from the hydraulic drive circuit;

wherein the hydraulic drive system is designed to trigger a discharge operation of the discharge valve assembly to discharge fluid to the fluid reservoir when the temperature of the fluid in the hydraulic drive circuit is above a predetermined discharge fluid threshold temperature or is within a predetermined discharge fluid temperature range and, when the discharge valve assembly has been triggered to discharge fluid from the hydraulic drive circuit to the fluid reservoir in dependence on the temperature of the fluid in the hydraulic drive circuit, to adjust the quantity of fluid discharged to the fluid reservoir and/or the fluid discharge rate as a function of the ambient temperature and/or the degree of contamination and/or the time that has elapsed since the last start-up of the hydraulic drive system and/or the time that has elapsed since the last fluid discharge from the hydraulic drive circuit.

* * * * *